United States Patent [19]

Morimoto et al.

[11] Patent Number: 5,039,771

[45] Date of Patent: Aug. 13, 1991

[54] METHOD FOR THE PREPARATION OF A LADDER-TYPE ORGANOPOLYSILOXANE

[75] Inventors: Takashi Morimoto, Gunma; Hiroshi Yoshioka, Tokyo, both of Japan

[73] Assignee: Shin-Etsu Chemical Co., Ltd., Tokyo, Japan

[21] Appl. No.: 422,173

[22] Filed: Jan. 16, 1989

[30] Foreign Application Priority Data

Oct. 17, 1988 [JP] Japan .................. 63-261249

[51] Int. Cl.⁵ .............................. C08G 77/06
[52] U.S. Cl. ...................... 528/14; 528/21; 528/33
[58] Field of Search ............... 528/33, 14, 21

[56] References Cited

U.S. PATENT DOCUMENTS 3,294,737 12/1966 Krantz .................. 328/21
3,294,738 12/1966 Krantz .................. 328/21

Primary Examiner—Melvyn I. Marquis

Attorney, Agent, or Firm—Millen, White & Zelano

[57] ABSTRACT

An oligomeric cage-like poly(silsesquioxane) of the general formula

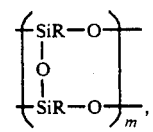

in which R is a monovalent hydrocarbon group and m is 4 to 12, can be polymerized by being admixed with a catalyst, e.g. alkali hydroxide or fluoride, and irradiated with microwaves. Different from conventional method of thermal polymerization, the polymerization reaction proceeds very uniformly at a high velocity to give a polymer of a high average molecular weight and narrow molecular weight distribution.

8 Claims, No Drawings

METHOD FOR THE PREPARATION OF A LADDER-TYPE ORGANOPOLYSILOXANE

BACKGROUND OF THE INVENTION

The present invention relates to a method for the preparation of an organopolysiloxane having a ladder-like molecular structure. More particularly, the invention relates to an efficient and reproducible method for the preparation of an organopolysiloxane having a ladder-like molecular structure of a high degree of polymerization having a relatively narrow molecular weight distribution and useful as a resist material, coating material and the like.

An organopolysiloxane having a ladder-like molecular structure, referred to as a ladder polysiloxane hereinbelow, is a known polymer in the prior art and represented by the general formula

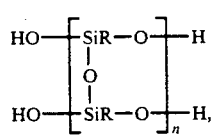

(I)

in which R is a substituted or unsubstituted monovalent hydrocarbon group having 1 to 20 carbon atoms and the subscript n is a positive integer. Among several known methods for the preparation of such a ladder polysiloxane, disclosures in Japanese Patent Publications No. 37-550 and No. 40-15989 teach a method in which an oligomeric polysiloxane having a cage-like or double-ring structure formed by the dehydration condensation for ring-formation between the silanolic hydroxy groups in each of the upper and lower polysiloxane sequences in the general formula (I), in which the value of n is, for example, 4 to 12, is admixed with an alkali catalyst such as potassium hydroxide and subjected to thermal polymerization in a solution. Although a ladder polysiloxane having a relatively narrow molecular weight distribution can be obtained by this method when the preparation is conducted in a small scale, this method is not always quite satisfactory when conducted in a large scale in respect of the homogeneity of the polymerization reaction and the broad molecular weight distribution of the product because, due to the very limited amount of the solvent usable in the polymerization mixture, the polymerization reaction proceeds in a seemingly solid phase so that uniformity in the temperature of the polymerization mixture can hardly be ensured sometimes to cause gelation of the polymerization mixture at or in the vicinity of the reactor walls leaving, on the other hand, the core portion of the polymerization mixture remote from the reactor walls polymerized only insufficiently.

An alternative method is disclosed in Japanese Patent Kokai No. 57-18729, according to which a ladder polysiloxane of a relatively narrow molecular weight distribution can be obtained by using a carbodiimide compound as the catalyst. To the contrary to the disclosure, the reproducibility of this method is not high enough so that the molecular weight distribution of the product is sometimes too broad in addition to the disadvantage that a ladder polysiloxane having a high molecular weight can hardly be obtained by this method.

Further alternatively, a method is disclosed in Japanese Patent Kokai No. 59-108033 by using a fluoride of an alkali metal as the catalyst. This method is advantageous in respect of the increased reaction velocity as compared with the method by using an alkali catalyst but the problem of the inhomogeneous reaction still remains unsolved because the polymerization reaction in this method also proceeds in a seemingly solid phase resulting in a broad molecular weight distribution of the polymer product.

SUMMARY OF THE INVENTION

The present invention accordingly has an object to provide a novel and improved method for the preparation of a ladder polysiloxane of the general formula (I) free from the above described problems and disadvantages in the prior art methods.

Thus, the method of the present invention for the preparation of an organopolysiloxane having a ladder-like molecular structure represented by the general formula

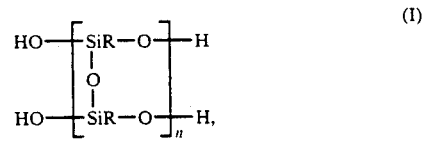

(I)

in which R is a substituted or unsubstituted monovalent hydrocarbon group having 1 to 20 carbon atoms and the subscript n is a positive integer, which comprises the steps of:

(a) dispersing a catalytic compound in an oligomeric organopolysiloxane having a cage-like or double-ring molecular structure represented by the general formula

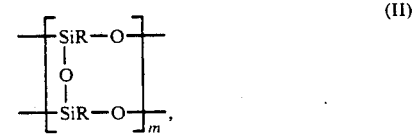

(II)

in which R has the same meaning as defined above and the subscript m is a positive integer in the range from 4 to 12 to form a mixture; and (b) irradiating the mixture with electromagnetic waves of a microwave frequency.

DETAILED DESCRIPTION OF THE PREFERRED EMBODIMENTS

The starting material used in the inventive method is an oligomeric organopolysiloxane represented by the above given general formula (II) having a cage-like or double-ring structure. Such an oligomeric cage polysiloxane is disclosed, for example, in Japanese Patent Publications No. 37-550, No. 61-51599 and No. 40-15789. In the general formula (II), the symbol R denotes a substituted or unsubstituted monovalent hydrocarbon group having 1 to 20 carbon atoms exemplified by alkyl groups such as methyl, ethyl, propyl, butyl, hexyl, heptyl and octyl groups, alkenyl groups such as vinyl, allyl, hexenyl, heptenyl and octenyl groups and aryl groups such as phenyl and naphthyl groups as well as those substituted hydrocarbon groups obtained by replacing a part or all of the hydrogen atoms in the above named hydrocarbon groups with halogen atoms, cyano groups, hydroxy groups, acyloxy groups, amino groups and the like such as chloromethyl, 3,3,3-trifluoropropyl, chlorophenyl, 2-cyanoethyl, hydroxyphenyl, acetoxyphenyl and aminophenyl groups. The subscript m in the general formula (II) is a positive integer in the range from 4 to 12. Suitable oligomeric cage polysiloxanes as the starting material in the inventive method include double ring-type octaphenyl octasiloxane, double ring-type dodecaphenyl dodecasiloxane and the like.

The oligomeric polysiloxane as the starting material in the inventive method can be obtained according to a known method in which, for example, a trifunctional organochlorosilane, such as methyl trichlorosilane, vinyl trichlorosilane, phenyl trichlorosilane and the like, is mixed with sodium hydrogen carbonate and toluene and the mixture is kept at a temperature in the range from 0° to 25° C.

In step (a) of the inventive method, the above described oligomeric cage polysiloxane is admixed with an organic solvent and a catalytic compound. Various kinds of organic solvents can be used without particular limitations provided that the solvent has a high boiling point. Preferable organic solvents include diphenyl ether and biphenyl in respect of the good compatibility with the starting material as well as the product. The amount of the organic solvent added to the starting oligomeric cage polysiloxane is usually in the range from 0.5 to 20% by weight based on the oligomeric polysiloxane.

The catalytic compound added to the oligomeric cage polysiloxane can be any of known ones including alkali metal hydroxides such as potassium hydroxide and sodium hydroxide, alkaline earth metal hydroxides such as calcium hydroxide and magnesium hydroxide, alkali metal fluorides such as potassium fluoride, sodium fluoride and cesium fluoride, alkaline earth metal fluorides such as calcium fluoride and magnesium fluoride, quaternary tetraalkyl ammonium fluorides such as tetramethyl ammonium fluoride and tetraethyl ammonium fluoride, carbodiimide compounds such as bis(cyclohexyl carbodiimide) and the like, and so on, of which alkali metal hydroxides and alkali metal fluorides are preferred. The amount of the catalytic compound in the polymerization mixture is usually in the range from 0.01 to 5% by weight based on the starting oligomeric cage polysiloxane.

In step (b) of the inventive method, the polymerization mixture described above is irradiated with electromagnetic waves of a microwave frequency so that the oligomeric cage polysiloxane is polymerized to give the ladder polysiloxane of the general formula (I) in which the subscript n has a value larger than the subscript m in the general formula (II). The frequency of the microwave can be in the range from 1000 MHz to 1000 GHz. For example, the microwaves emitted from a mgnetron used in household microwave ovens having a frequency of 2540 MHz are suitable for the purpose though not limitative thereto. The intensity of the microwave irradiation is a factor influencing the molecular weight of the ladder polysiloxane as the product and not particularly limitative. A microwave apparatus having an output of, for example, 500 watts to 2000 watts can be used satisfactorily in order to obtain an irradiation intensity of 3 to 1000 watts·hour/g or, preferably, 5 to 800 watts·hour/g.

When the polymerization mixture containing the oligomeric ladder polysiloxane and the catalytic compound dissolved or dispersed in the organic solvent is irradiated with microwaves, the polymerization mixture can be heated uniformly throughout without local heating so that the disadvantages of localized gelation of the mixture and broadness of the molecular weight distribution can be avoided. Consequently, the ladder polysiloxane obtained by the inventive method has a high molecular weight and narrow molecular weight distribution in addition to the advantages of the high velocity of polymerization and high yield of the product. Accordingly, the ladder polysiloxane obtained by the inventive method is useful in various applications as a resist material, coating material and the like.

In the following, examples are given to illustrate the method of the invention in more detail as preceded by a description of the procedure for the preparation of the oligomeric cage polysiloxane used as a starting material in the examples.

PREPARATION OF OLIGOMERIC CAGE POLYSILOXANE

Into a four-necked flask equipped with a stirrer, thermometer, reflux condenser and dropping funnel were introduced 255 g (3.3 moles) of sodium hydrogen carbonate, 250 g of toluene and 250 g of xylene to form a mixture which was chilled at a temperature of 10° C. or below by dipping the flask in an ice bath. Thereafter, 211.6 g (1 mole) of phenyl trichlorosilane were added dropwise to the mixture in the flask at such a rate that the temperature of the reaction mixture in the flask never exceeded 20° C. After completion of the dropwise addition of the silane, the mixture was repeatedly washed to neutrality with deionized water followed by dehydration for 24 hours over silica gel and filtration.

Thereafter, the filtrate was stripped of toluene and xylene by distillation and the residue was dried in a drying oven at 100° C. under reduced pressure to give a white powdery product which was a cage-type polyphenyl siloxane oligomer having a number-average molecular weight of about 1500 by the gel permeation chromatography making reference to polystyrenes.

EXAMPLE 1

Into a four-necked flask equipped with a reflux condenser, stirrer, thermometer and dropping funnel were introduced 10 g of the oligomeric cage polysiloxane obtained above and 50 ml of toluene to form a uniform solution to which 0.29 g of a 1% by weight methyl alcohol solution of potassium hydroxide, 0.85 g of diphenyl ether and 0.31 g of biphenyl were added.

In the next place, toluene and methyl alcohol were removed from the mixture by distillation and the residue was subjected to microwave irradiation for 70 minutes in a household-type microwave oven of 500 watts output working at a voltage of 100 volts. After completion of the microwave irradiation, the reaction mixture was allowed to cool to room temperature and 400 g of toluene were added thereto to give a solution, which was poured into 2 liters of methyl alcohol to give precipitates. The precipitates collected by filtration were dried at 100° C. for 1 hour in a drying oven under reduced pressure. The yield of the thus obtained product was 8.8 g. The results of the infrared absorption spectrophotometric analysis led to a conclusion that this product was a ladder-type phenyl silsesquioxane polymer which had a number-average molecular weight of 45,000 with reference to polystyrenes and a dispersion of 2.5 according to the results of the gel permeation chromatography.

EXAMPLE 2

The experimental procedure was substantially the same as in Example 1 described above excepting replacement of 0.29 g of the 1% by weight methyl alcohol solution of potassium hydroxide with 0.79 g of a 1% by weight methyl alcohol solution of cesium fluoride. The polymeric product obtained in a yield of 8.6 g had a number-average molecular weight of 53,000 with reference to polystyrenes and a dispersion of 2.7 according to the results of the gel permeation chromatography.

EXAMPLE 3

The experimental procedure was substantially the same as in Example 1 described above except that the microwave irradiation was performed for 40 minutes instead of 70 minutes. The polymeric product obtained in a yield of 8.9 g had a number-average molecular weight of 34,000 with reference to polystyrenes and a dispersion of 2.4 according to the results of the gel permeation chromatography.

EXAMPLE 4

The experimental procedure was substantially the same as in Example 2 described above except that the microwave irradiation was performed for 40 minutes instead of 70 minutes. The polymeric product obtained in a yield of 8.7 g had a number-average molecular weight of 37,000 with reference to polystyrenes and a dispersion of 2.4 according to the results of the gel permeation chromatography.

COMPARATIVE EXAMPLE 1

The experimental procedure was substantially the same as in Example 1 described above except that the treatment of microwave irradiation was not undertaken but the polymerization was conducted by a heat treatment at 200° C. for 10 hours. The polymeric product obtained in a yield of only 3.5 g had a number-average molecular weight of 25,000 with reference to polystyrenes and a dispersion of 4.5 according to the results of the gel permeation chromatography.

COMPARATIVE EXAMPLE 2

The experimental procedure was substantially the same as in Example 2 described above except that the treatment of microwave irradiation was not undertaken but the polymerization was conducted by a heat treatment at 200° C. for 10 hours. The polymeric product obtained in a yield of 7.8 g had a number-average molecular weight of 27,000 with reference to polystyrenes and a dispersion of 4.8 according to the results of the gel permeation chromatography.

EXAMPLE 5

The experimental procedure was substantially the same as in Example 1 described above except that the microwave irradiation was performed for 210 minutes instead of 70 minutes. The polymeric product obtained in a yield of 7.8 g had a number-average molecular weight of 1,230,000 with reference to polystyrenes and a dispersion of 6.8 according to the results of the gel permeation chromatography.

What is claimed is:

1. A method for the preparation of an organopolysiloxane having a ladder-like molecular structure represented by the general formula

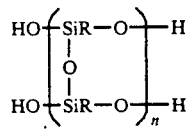

in which R is a substituted or unsubstituted monovalent hydrocarbon group having 1 to 20 carbon atoms and the subscript n is a positive integer, which comprises the steps of:
   (a) dispersing an alkali metal hydroxide or alkali metal fluoride as a catalyst in an oligomeric organopolysiloxane having a cage molecular structure represented by the general formula

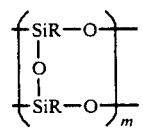

in which R has the same meaning as defined above and the subscript m is a positive integer in the range from 4 to 12, to form a mixture; and
   (b) irradiating the mixture with electromagnetic waves of a microwave frequency.

2. The method for the preparation of an organopolysiloxane having a ladder-like molecular structure as claimed in claim 1 wherein the mixture irradiated with the electromagnetic waves further comprises diphenyl ether or biphenyl.

3. The method for the preparation of an organopolysiloxane having a ladder-like molecular structure as claimed in claim 2 wherein the amount of the diphenyl ether or biphenyl is in the range from 0.5 to 20% by weight based on the amount of the oligomeric organopolysiloxane.

4. The method for the preparation of an organopolysiloxane having a ladder-like molecular structure as claimed in claim 1 wherein the catalytic compound is an alkali metal hydroxide or an alkali metal fluoride.

5. The method for the preparation of an organopolysiloxane having a ladder-like molecular structure as claimed in claim 1 wherein the amount of the catalytic compound is in the range from 0.01 to 5% by weight based on the amount of the oligomeric organopolysiloxane.

6. The method for the preparation of an organopolysiloxane having a ladder-like molecular structure as claimed in claim 1 wherein the microwaves frequency is in the range from 1000 MHz to 1000 GHz.

7. The method for the preparation of an organopolysiloxane having a ladder-like molecular structure as claimed in claim 1 wherein the intensity of the irradiation with electromagnetic waves is in the range from 3 to 1000 watts·hour/g.

8. The method for the preparation of an organopolysiloxane having a ladder-like molecular structure as claimed in claim 1 wherein the group denoted by R is a phenyl group.

* * * * *

UNITED STATES PATENT AND TRADEMARK OFFICE
CERTIFICATE OF CORRECTION

PATENT NO. : 5,039,771

DATED : August 13, 1991

INVENTOR(S) : Takashi MORIMOTO et al.

It is certified that error appears in the above-identified patent and that said Letters Patent is hereby corrected as shown below:

TITLE PAGE:   Item [22]

Reads - - -

Filed: Jan. 16, 1989

Should read - - - - - - -

Filed: Oct. 16, 1989

Signed and Sealed this

Third Day of November, 1992

*Attest:*

DOUGLAS B. COMER

*Attesting Officer*     *Acting Commissioner of Patents and Trademarks*